UNITED STATES PATENT OFFICE.

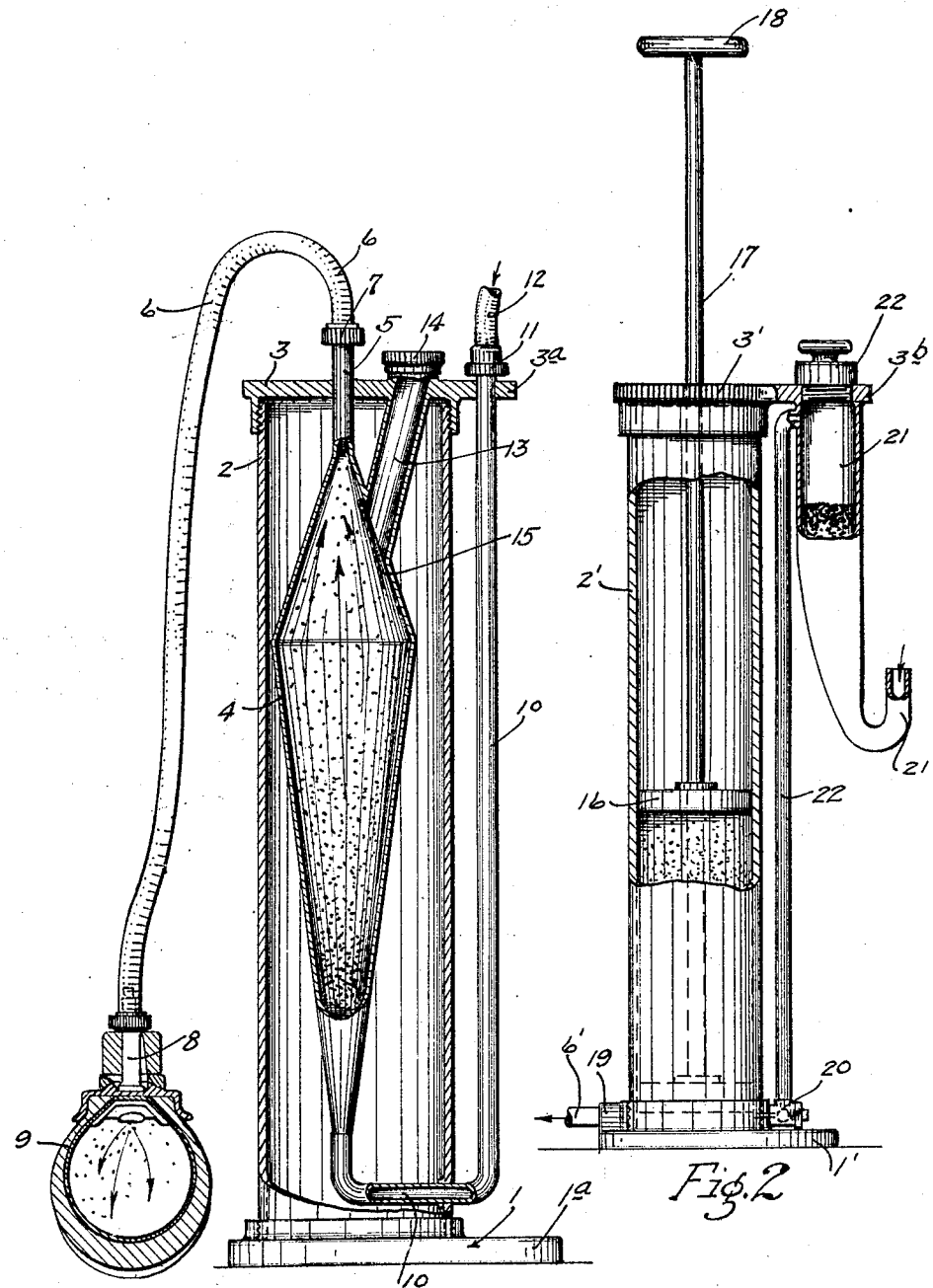

EMIL R. DRAVER, OF RICHMOND, INDIANA.

MEANS FOR CHARGING PNEUMATIC TIRES WITH DUST-LADEN AIR.

1,411,424. Specification of Letters Patent. Patented Apr. 4, 1922.

Application filed February 15, 1921. Serial No. 445,082.

*To all whom it may concern:*

Be it known that I, EMIL R. DRAVER, a citizen of the United States, residing at Richmond, in the county of Wayne and State of Indiana, have invented certain new and useful Improvements in Means for Charging Pneumatic Tires with Dust-Laden Air; and I do hereby declare the following to be a full, clear, and exact description of the invention, such as will enable others skilled in the art to which is appertains to make and use the same.

This invention relates to an apparatus for charging a quantity of dry powdered material into a pneumatic tire along with the air charged into the same.

It is well known that it has been heretofore impossible to prevent slow leakage from charged pneumatic tires even when the same are new and apparently in perfect condition. It has thus been necessary to recharge tires at rather frequent intervals.

The applicant has invented a novel method by which this small leakage in an apparently perfect tire is prevented. According to the said method, a small quantity of dry powdered material is placed in the tire and the apparatus of this invention is for the purpose of conveniently and efficiently introducing said powdered substance into the tire.

It is an object of this invention therefore to provide a simple and convenient means by which the desired quantity of dry powdered substance may be quickly and efficiently placed in the tire. This together with the other objects and advantages of the invention will be apparent from the following description made in connection with the accompanying drawings, in which—

Fig. 1 is for the most part a vertical section of an apparatus for the purpose described; and Fig. 2 is a view in side elevation of the modified form of apparatus, a part thereof being shown in section.

Referring to the drawings:

The device comprises a base member 1 having a laterally projecting flange portion 1ª to which base member is secured by means of screw threads or other suitable means, a thin metal casing 2 of cylindrical form which has suitably secured to its upper end by screw threads or other means a cap member 3, which is provided with a laterally extending lug 3ª. A biconical container 4 having its wide diameter relatively near the top portion thereof is disposed in the casing 2 and provided at its upper end with a comparatively small outlet tube 5, which projects through the cap 3 and is screw threaded at its outer end or otherwise formed to afford convenient means for the attachment of a tube or hose 6 having a knurled connecting member 7 of any ordinary form connected thereto. The other end of the tube 6 is shown as provided with the usual screw connection adapted to engage in the valve stem of a tire, which stem is illustrated as 8 and which is connected in the usual and ordinary manner to an inner tube of a tire 9. The container 4 is also provided at its lower end with a comparatively small tube 10, which passes laterally through the casing 2 near the bottom thereof and then upwardly along the side of said casing and through the lug 3ª of the cap member 3 and is formed with screw threads at its upper portion to conveniently receive the connection 11 of a hose or tube 12 adapted to extend to a compressed air tank or other suitable air supply. A tube 13 of considerably larger dimension than the tubes 5 and 10 extends from the side of the upper portion of the container 4, upwardly to and through the cap portion 3, the latter being formed with a threaded projection surrounding the opening communicating with the tube 13, which projection is adapted to receive a knurled closing cap 14. A flap valve member 15 is pivoted at its upper side near the upper edge of the opening into tube 13 and adapted to swing loosely on said pivot and to move into a position to close the opening into the tube 13.

In using the device described, a small quantity of the dry powdered substance will be introduced into the container 4 by removing cap 14 and dropping the substance through the top 13. The material will readily drop past the valve 15 and fall into the lower part of the container 4 and onto the side walls thereof. The tube 12 being connected to the device, the tube 6 connected to a tire and the air supply turned on, the air will pass through the tube 10 and upwardly through the container 4 as indicated by the arrows in Fig. 1 and the powdered substance will be thoroughly commingled therewith and will be forced by and carried with the air into the tire 9, as indicated by the arrows therein. When the air is turned on, the same will tend to close the valve 15 so that the powdered substance will be prevented from being blown into the tube 13. A desired amount of powdered substance can thus be quickly and conveniently charged into the tire by the use of the device.

In Fig. 2, a device for introducing the powdered substance into a tire is shown applied to a tire pump adapted to be operated by hand. This pump comprises the usual base member 1' and the cap member 3', which latter is provided with a laterally extending portion 3$^b$. The usual pump cylinder 2' extends between the base member 1' and the cap 3' and a plunger member 16 carried by a plunger rod 17 having the handle 18 at the outer end thereof is also provided. The pump cylinder 2' is provided with the usual outlet portion 19 adapted to receive the tube 6' which like the tube 6 shown in Fig. 1 will be equipped with the usual connections adapted to be attached to the tire valve. The air inlet of the pump is through a member 20, which is provided with a ball check valve adapted to permit air to pass into the cylinder 2', but which will prevent the passage of air therefrom. A member 21 of general cylindrical shape but having a tapered lower end terminating in an upwardly curved tube portion 21 is provided and adapted to be disposed below and secured to the extension 3$^b$ and a tube 22 extends from the member 20 upwardly along the side of the casing 2' and opens into the member 21 near the top thereof. The portion 3$^b$ is provided with an opening aligned with the opening in the member 21, which opening is arranged to be closed by closing cap 22 threaded thereinto.

The operation of this device is as follows: A desired amount of dry powdered substance will be placed in the container 21 and the cap 22 positioned to close the upper end thereof, the tube 6' being connected to a tire and the pump operated by handle 18. The air will be drawn in through the tube 21 as indicated by the arrow and will pass upwardly through the powdered substance in container 21 and commingled therewith and carry the same through the tube 22 into the pump casing 2' from whence it will be discharged into the tire through the tube 6'. A desired amount of powdered substance can thus be quickly and conveniently charged into the tire.

From the above description it is seen that applicant has provided two convenient forms of apparatus by means of which the dry powdered substance can be quickly introduced into the tire by either a constant supply of air or by means of the usual hand pump.

It will, of course, be understood that only a small quantity of the substance is used, which quantity will be easily mixed with the air and carried thereby into the tube.

The parts described can be made of any desired material, which is found convenient in practice and it will, of course, be understood that various changes in the form, details and proportions of the device can be made without departing from the scope of the applicant's invention, which generally stated consists in the matter shown and described and set forth in the appended claims.

What is claimed is:

1. An apparatus for introducing a dry powdered substance into a tire with the air, having in combination a container, a conduit leading from one part thereof through which air is adapted to pass to the tire and a conduit communicating with another part thereof through which air is adapted to enter said container, said container having an opening thereinto through which the powdered substance can be introduced.

2. An apparatus of the character described, comprising a container having a tapered lower portion terminating in a tube through which air is adapted to pass into the container, a conduit leading from the upper end of said container and having means connected therewith through which air is adapted to pass to a tire, said container having an opening at its upper portion through which material can be introduced thereinto and means for closing said opening.

3. An apparatus of the character described, comprising a casing, a member disposed therein adapted to receive a dry powdered substance, said member converging at its upper end and terminating in a tube extending through the top of said casing, and said member converging at its lower end and terminating in a tube extending laterally through said casing near the bottom thereof, and said member having a conduit extending from its upper portion through the top of said casing and a closure for said conduit, said first mentioned tube being adapted to be connected with an automobile tire and said second mentioned tube being adapted and connected to an air supply.

4. An apparatus of the character described, comprising a casing, a biconical container member disposed therein, a tube leading from the upper portion of said container extending through the top of said casing and adapted to be connected to an automobile tire valve, a tube extending from the lower end of said container outside of said casing and upwardly along the side thereof and adapted to be connected to an air supply, a conduit leading from the upper portion of said container through the top of said casing, a closure for said conduit and a valve member disposed in said casing at the end of said conduit and adapted to close the same.

5. An apparatus of the class described, comprising a base member having a laterally projecting flange and cylindrical casing extending upwardly therefrom, and a cap member secured to the upper end of said casing, a container member disposed in said casing and having a tube leading from its upper end, extending through said cap member, adapted to be connected to a tire valve, a tube extending from the lower end of said container through the casing upwardly along the side of the same and through the cap member and adapted to be connected to an air supply, a conduit connected to the upper end of the container and extending upwardly through the cap member, a valve in the lower end of said conduit and a closure member for the upper end thereof.

6. An apparatus for introducing a dry powdered substance into a tire with the air, having in combination, a container adapted to receive a quantity of the dry powdered substance, a conduit leading from the top of said container through which air is adapted to pass to the tire from the container and another conduit communicating with the container through which air is adapted to enter said container to carry the dust therein out through said first mentioned conduit.

In testimony whereof I affix my signature.

EMIL R. DRAVER.